(12) United States Patent
Fauchery et al.

(10) Patent No.: US 10,627,045 B2
(45) Date of Patent: Apr. 21, 2020

(54) CONNECTOR ASSEMBLY FITTING WITH ANTI-PUNCTURING FEATURE

(71) Applicants: Florent Fauchery, Montmeyran (FR); Anthony Jerome, Lons-le-Saunier (FR); Nicolas Marotel, Portes lès Valence (FR)

(72) Inventors: Florent Fauchery, Montmeyran (FR); Anthony Jerome, Lons-le-Saunier (FR); Nicolas Marotel, Portes lès Valence (FR)

(73) Assignee: SKF AEROSPACE FRANCE S.A.S., Saint-Vallier (FR)

( * ) Notice: Subject to any disclaimer, the term of this patent is extended or adjusted under 35 U.S.C. 154(b) by 71 days.

(21) Appl. No.: 15/208,836

(22) Filed: Jul. 13, 2016

(65) Prior Publication Data

US 2018/0017206 A1    Jan. 18, 2018

(51) Int. Cl.
  *F16M 13/02*   (2006.01)
  *F16B 5/02*    (2006.01)
  *F16B 43/00*   (2006.01)

(52) U.S. Cl.
  CPC ............. *F16M 13/025* (2013.01); *F16B 5/02* (2013.01); *F16B 43/00* (2013.01)

(58) Field of Classification Search
  CPC .......... F16B 13/025; F16B 5/02; F16B 43/00; F16B 5/0241; F16B 5/0056; Y10T 428/24174; Y10T 428/24273; Y10T 428/24322; Y10T 403/42; Y10T 403/73
  USPC .......................... 52/698, 699, 288.1; 428/119
  See application file for complete search history.

(56) References Cited

U.S. PATENT DOCUMENTS

| | | | | |
|---|---|---|---|---|
| 5,700,103 A | * | 12/1997 | Tsai | F16B 37/005 403/260 |
| 6,089,723 A | * | 7/2000 | Ogasawara | B60R 1/06 359/871 |
| 7,618,012 B2 | * | 11/2009 | Itoh | F16B 5/0241 248/220.21 |
| 2007/0145228 A1 | * | 6/2007 | Itoh | B60R 11/02 248/637 |

(Continued)

FOREIGN PATENT DOCUMENTS

| | | | | |
|---|---|---|---|---|
| DE | 102015210308 A1 | * | 12/2016 | ............... F16B 5/02 |
| JP | 4518021 B2 | * | 8/2010 | ............ B60R 11/02 |

*Primary Examiner* — Kimberly T Wood
(74) *Attorney, Agent, or Firm* — J-Tek Law PLLC; Scott T. Wakeman; Mark A. Ussai

(57) ABSTRACT

A connector assembly includes a fitting having first and second mounting portions having integrally connected inner ends and opposing outer ends. The first mounting portion is connectable to the first member and the second mounting portion is inclined with respect to the first portion and connectable to the second member. The first mounting portion has inner and outer surfaces, one or more mounting holes extending between the surfaces and a load surface section extending about each mounting hole. The first mounting portion also has a recessed section located between each mounting hole and the second mounting portion and adjacent to the washer load surface section. A washer is disposeable upon the first portion load surface section and sized such that an outer portion of the washer extends over the recessed section so that a clearance gap is defined between a washer inner surface and the first mounting portion.

7 Claims, 8 Drawing Sheets

(56) References Cited

U.S. PATENT DOCUMENTS

| | | | |
|---|---|---|---|
| 2011/0256418 A1* | 10/2011 | McGowan | C25D 13/04 |
| | | | 428/594 |
| 2012/0205507 A1* | 8/2012 | Sato | H05K 5/0073 |
| | | | 248/222.13 |
| 2017/0284435 A1* | 10/2017 | Fauchery | F16B 5/02 |

* cited by examiner

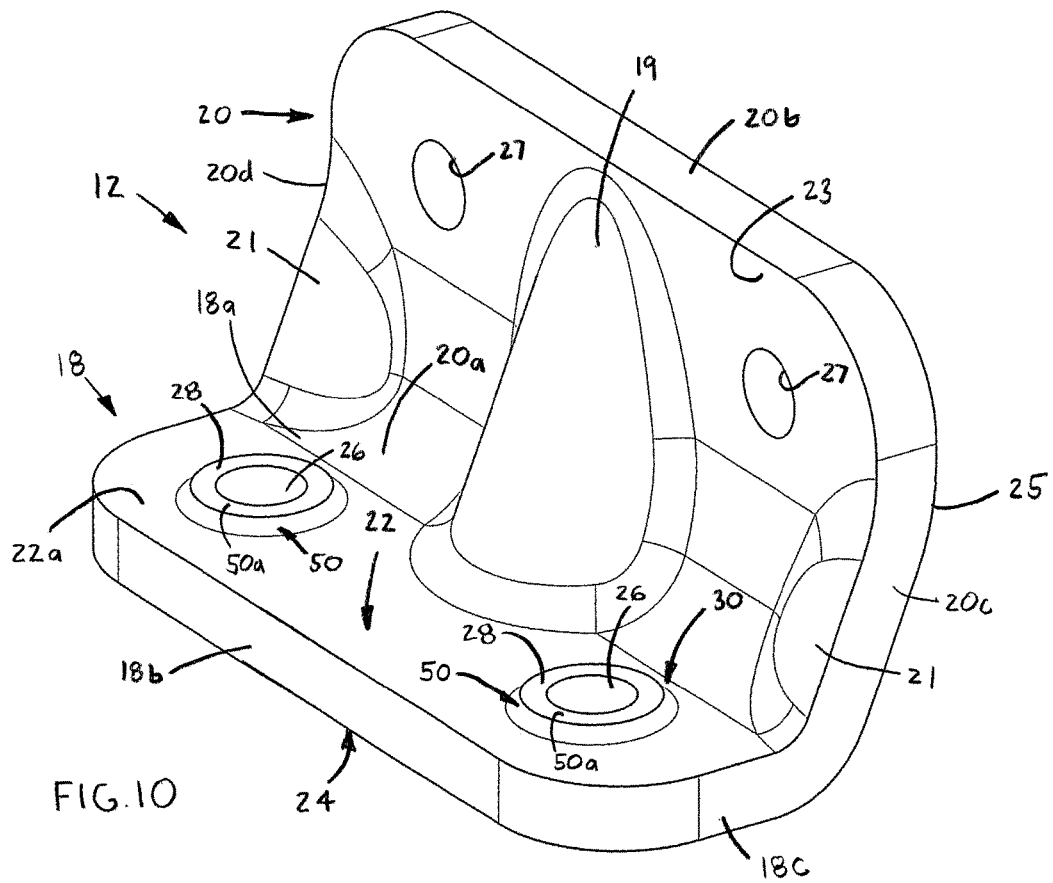
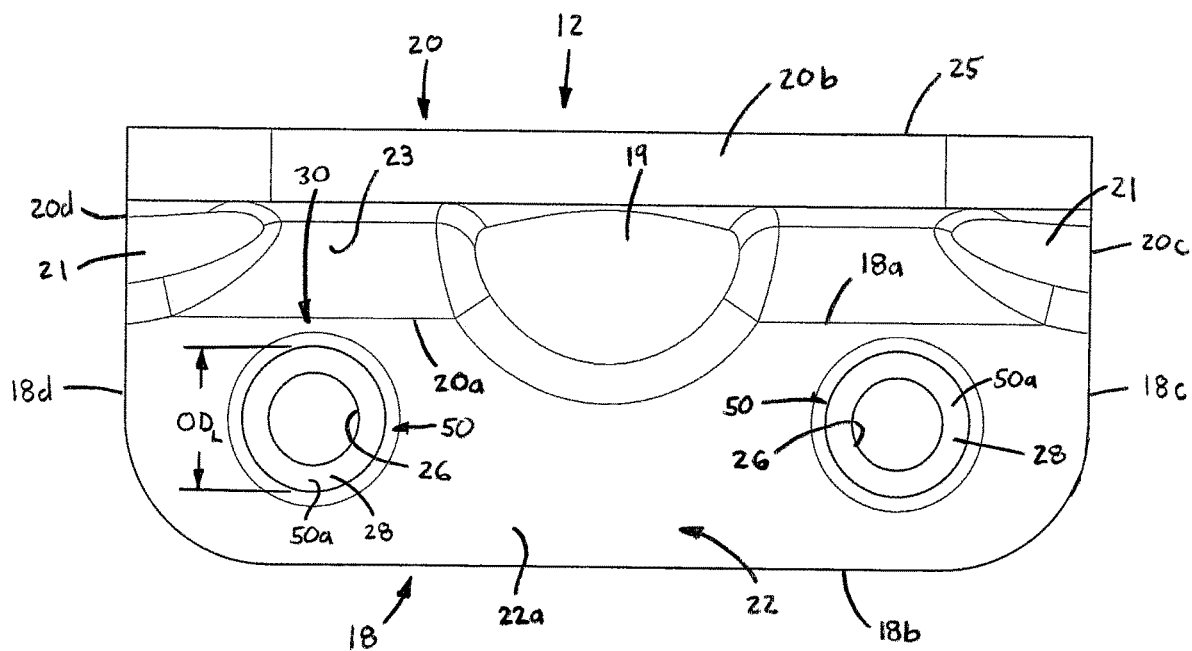

CONNECTOR ASSEMBLY FITTING WITH ANTI-PUNCTURING FEATURE

BACKGROUND OF THE INVENTION

The present invention relates to connector assemblies, particularly connectors including fittings used to connect two or more members having an angled relative orientation.

Fittings or brackets for connecting two or more members are generally known. When intended to connect to surfaces that are generally orthogonal to each other, such fittings/brackets are often generally L-shaped, but may have any other relative orientation as required for the particular surfaces of the members being connected. In certain applications for which weight is an important consideration, such as in the aircraft industry, these fittings may be made of a composite material consisting of fibers embedded within resin. With such materials, it is essential to avoid loading on the fitting that could result in harder materials, such as steel washers, from puncturing or cutting the composite material.

SUMMARY OF THE INVENTION

In one aspect, the present invention is a connector assembly for connecting at least first and second members. The connector assembly comprises a fitting having first and second mounting portions each having an inner end integrally connected with the inner end of the other mounting portion and an opposing, free outer end. The first mounting portion is connectable to the first member and the second mounting portion being inclined with respect to the first mounting portion and connectable to the second member. The first mounting portion has inner and outer surfaces and at least one mounting hole, which extends between the inner and outer surfaces and is configured to receive a portion of a fastener. The first portion inner surface has a washer load surface section extending generally circumferentially about the at least one mounting hole. Also, the first mounting portion further has a recessed section at least partially located between the at least one mounting hole and the second mounting portion and disposed adjacent to the washer load surface section. Further, the connector assembly also includes at least one washer having inner and outer surfaces and a hole extending between the inner and outer surfaces. The washer inner surface is disposeable upon the load surface section of the first mounting portion such that the washer hole is generally aligned with the at least one mounting hole. The washer is sized such that an outer portion of the washer extends over the recessed section of the first mounting portion so that a clearance gap is defined between the inner surface of the washer outer portion and the first mounting portion.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 10 is another perspective view of the second construction connector assembly, shown without washers;

FIG. 11 is another top plan view of the second construction connector assembly, shown without washers;

DETAILED DESCRIPTION OF THE INVENTION

Figure 1:
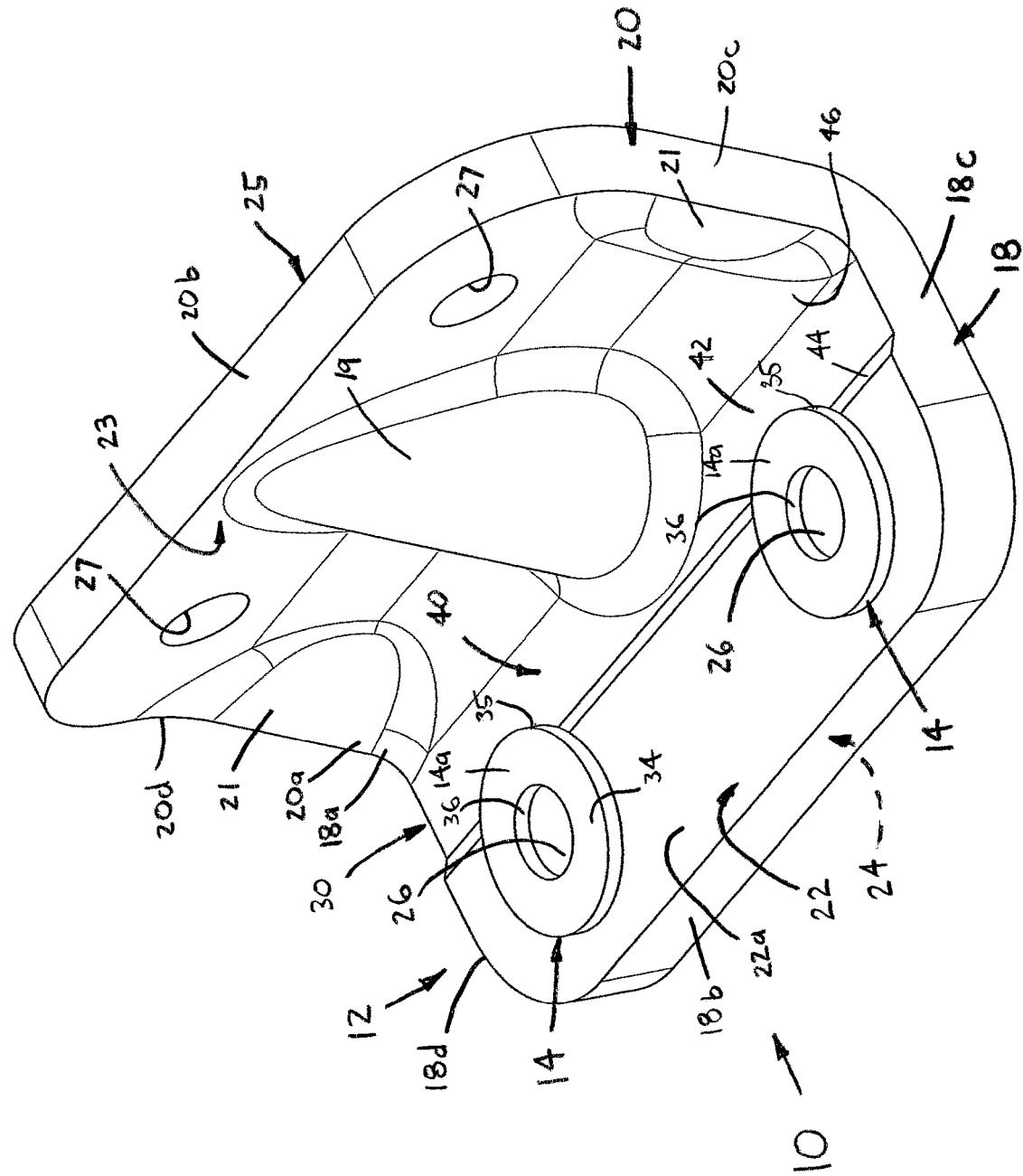
FIG. 1 is perspective view of a first construction of a connector assembly in accordance with the present invention, having a recessed section provided by an elongated groove.
Figure 2:
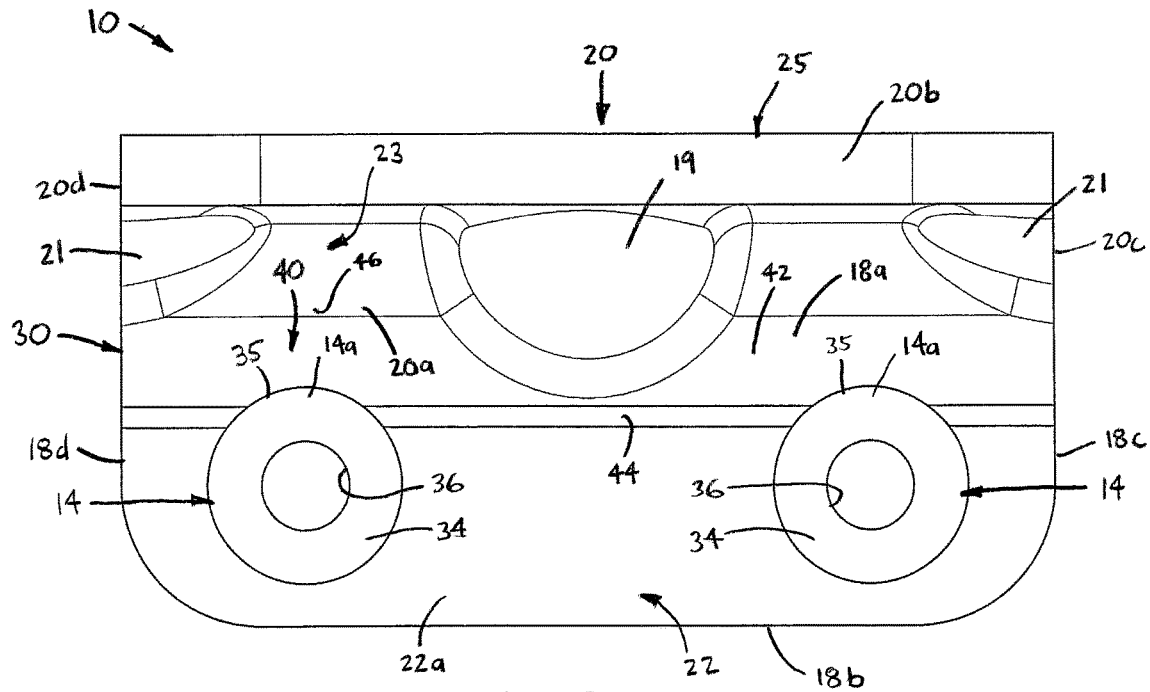
FIG. 2 is top plan view of the first construction connector assembly.
Figure 3:
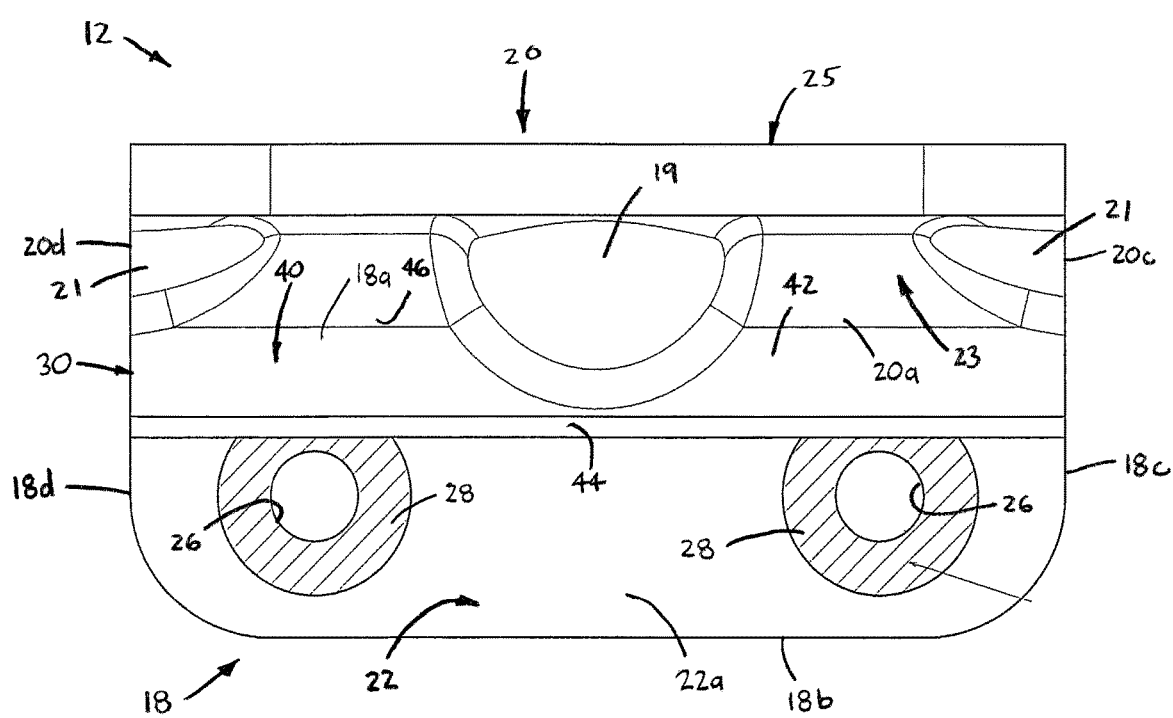
FIG. 3 is another top plan view of the first construction connector assembly, shown without washers and with load surface sections indicated with hatching.
Figure 4:
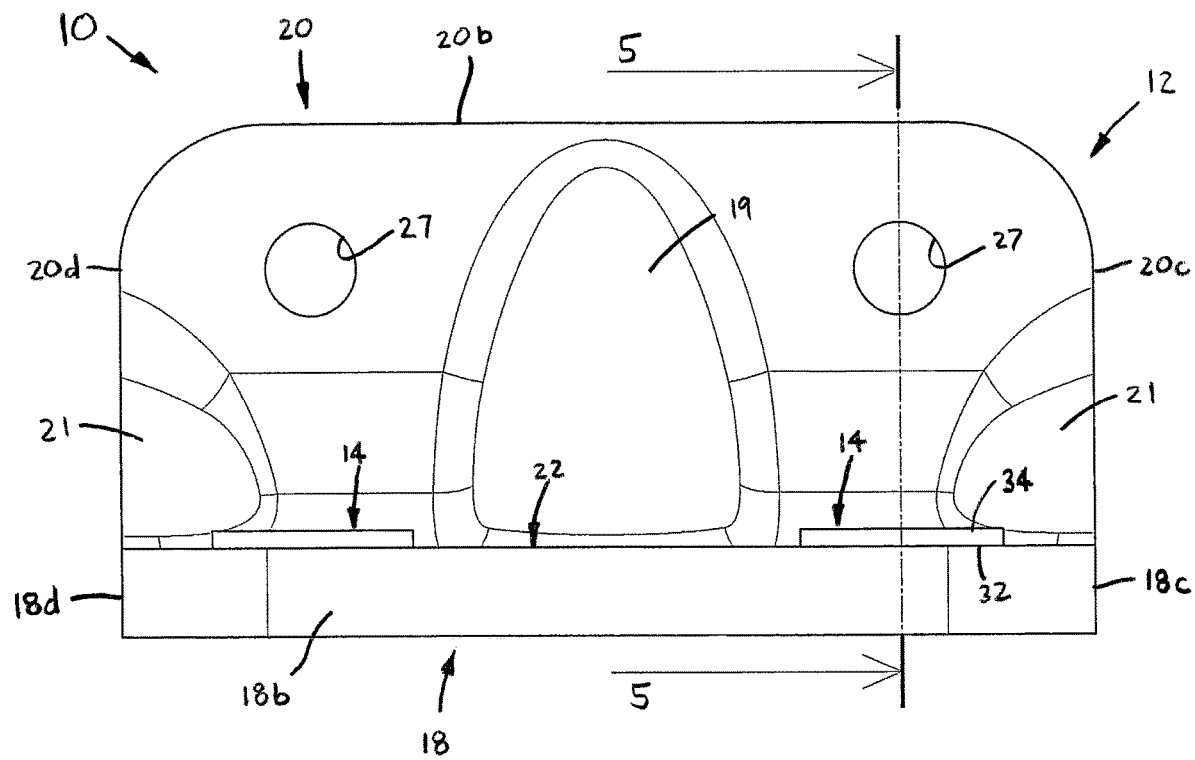
FIG. 4 is a front plan view of the first construction connector assembly
Figure 5:
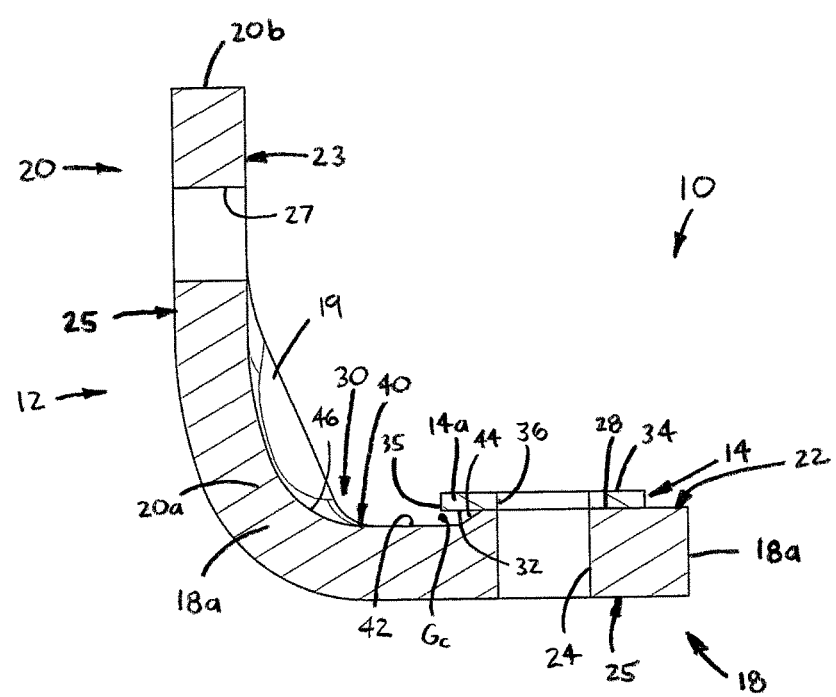
FIG. 5 is a section view through line 5-5 of FIG. 4.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-15 a connector assembly 10 for connecting at least first and second members 1 and 2 (FIGS. 6 and 14), respectively, and may be used to connect three or more members (only two shown). Each member 1, 2 has a surface 1a, 2a, respectively, extending generally angled with respect to the surface 2a, 1a of the other member 2, 1. The connector assembly 10 basically comprises a fitting 12, at least one and preferably a plurality of washers 14, and at least one and preferably a plurality of fasteners 16 (FIGS. 6, 7, 14 and 15), preferably threaded, for connecting the fitting 12 with one of the first and second members 1, 2. The fitting 12 is preferably formed of a composite material including fibers embedded in resin, is generally L-shaped and includes first and second mounting portions 18, 20, respectively. Each mounting portion 18, 20 has an inner end 18a, 20a integrally connected or formed with the inner end 20a, 18a of the other mounting portion 20, 18, and an opposing, outer free end 18b, 20b. The first mounting portion 18 is connectable to the first member 1 and the second mounting portion 20 is inclined or angled with respect to the first mounting portion 18 and is connectable to the second member 2. In certain embodiments, the fitting 12 may include third, fourth or more mounting portions (none shown) for connecting with third, fourth, etc., members (none depicted).

The first mounting portion 18 has inner and outer surfaces 22, 24, respectively, and at least one and preferably at least two mounting holes 26 extending between the inner and outer surfaces 22, 24, the outer surface 24 being disposeable on the surface 1a of the first member 1. Each mounting hole 26 is configured to receive a portion of a fastener 16 for connecting the first mounting portion 18 with the first member 1, and are preferably spaced laterally apart such that each hole 26 is disposed between the other mounting hole 26 and a separate one of two mounting portion side edges 18c, 18d, as described below. However, the first mounting portion 18 may include any number of mounting holes 26 (e.g., one, three, etc.) as required for a particular application of the connector assembly 10. Also, the second mounting portion 20 has inner and outer surfaces 23, 25 and preferably at least one, and most preferably a plurality (two shown), of mounting holes 27 extending between the inner and outer surfaces 23, 25, the outer surface 25 being disposable on the surface 2a of the second member 2. Each mounting hole 27 is configured to receive a portion of a fastener 16 for connecting the second mounting portion 20 to the second member 2. However, the second mounting portion 20 may alternatively be connectable to the second member 2 by any other appropriate means, such as by welding or bonding, by one or more rivets, by a lug connection, etc.

Further, the inner surface 22 of the first mounting portion 18 has at least one and preferably at least two washer load surface sections 28 each extending generally circumferentially about a separate one of the two mounting holes 26. The load surface section(s) 28 may be continuous with the remainder 22a of the mounting portion inner surface 22 (FIGS. 1-7) or may be spaced above a remainder 22a of the inner surface 22 (FIGS. 8-15), each structure being discussed in greater detail below. Additionally, the first mounting portion 18 also has a recessed section 30 at least partially located between the one or more mounting holes 26 and the second mounting portion 20, and disposed adjacent to the washer load surface section(s) 28. Preferably, the recessed section 30 is either formed by a groove 42 in the first mounting portion 18 or as a remainder 22a of the first mounting portion inner surface 22 with a fitting structure having outwardly spaced loading section(s) 28, as discussed below.

Furthermore, the one or more washers 14 are each preferably generally circular cylindrical and have inner and outer surfaces 32, 34, respectively (i.e., inner and outer with respect to placement on the fitting 12), a hole 36 extending between the inner and outer surfaces 32, 34, and an outer perimetrical edge 35. Although preferably generally circular as described and depicted in the drawings, any or all of the washers 14 may alternatively have any other appropriate shape, such as for example, generally rectangular, hexagonal, elliptical, complex-shaped, etc., and/or may have one or more projections or other additional structure, such as for example, a pair of sidewalls (not shown) extending outwardly from a generally flat central portion, as desired for a particular application. The inner surface 32 of each washer 14 is disposeable upon one of the load surface sections 28 of the first mounting portion 18, such that the washer hole 36 is generally aligned with the mounting hole 26 surrounded by the particular load surface section 28. The washer(s) 14 may each be retained on the load surface section 28 solely by clamping force exerted by a fastener 16 or may also be retained by bonding or by additional fasteners (e.g., one or more rivets) (not shown). Furthermore, each washer 14 is sized such that an outer portion 14a of the washer 14 extends over the recessed section 30 of the first mounting portion 18 so that a clearance gap $G_C$ is defined between the inner surface 32 of the washer outer portion 14a and the first mounting portion 18, as best shown in FIGS. 5-7 and 13-15.

More specifically, the recessed section 30 of the first mounting portion 18 is configured (i.e., formed and/or located) to prevent a section of the edge 35 at the washer outer portion 14a (i.e., the part of the edge 35 extending over the section 30) from contacting the fitting 12 when the inner end 18a of the first mounting portion 18 is deflected or bended generally toward the outer end 18b of the mounting portion 18, as indicated in FIGS. 6, 7, 14 and 15. Such bending or deflection can occur due to loading on the fitting and/or by relative displacement between the first and second members 1, 2, as discussed below.

Figure 6:
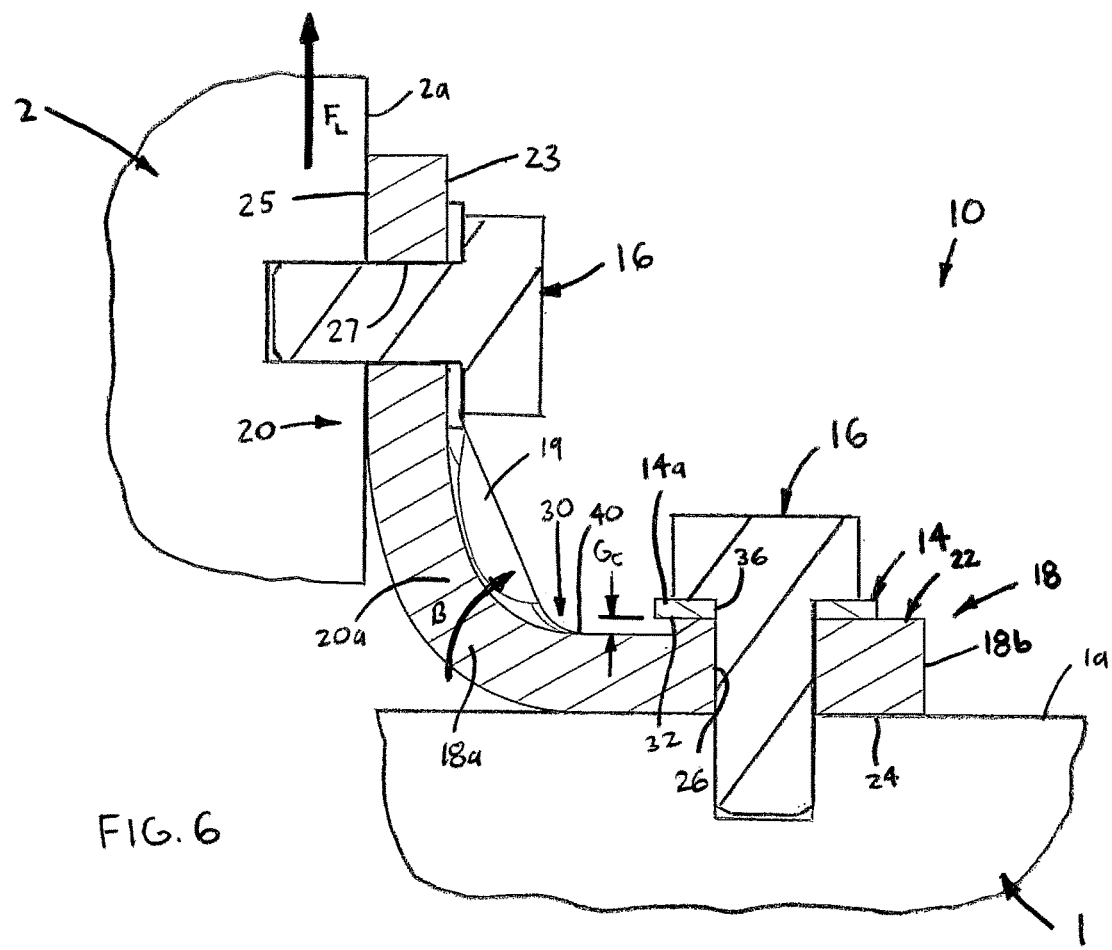
FIG. 6 is a sectional view of the connector assembly, shown connected with first and second members and indicating an applied load.
Figure 7:
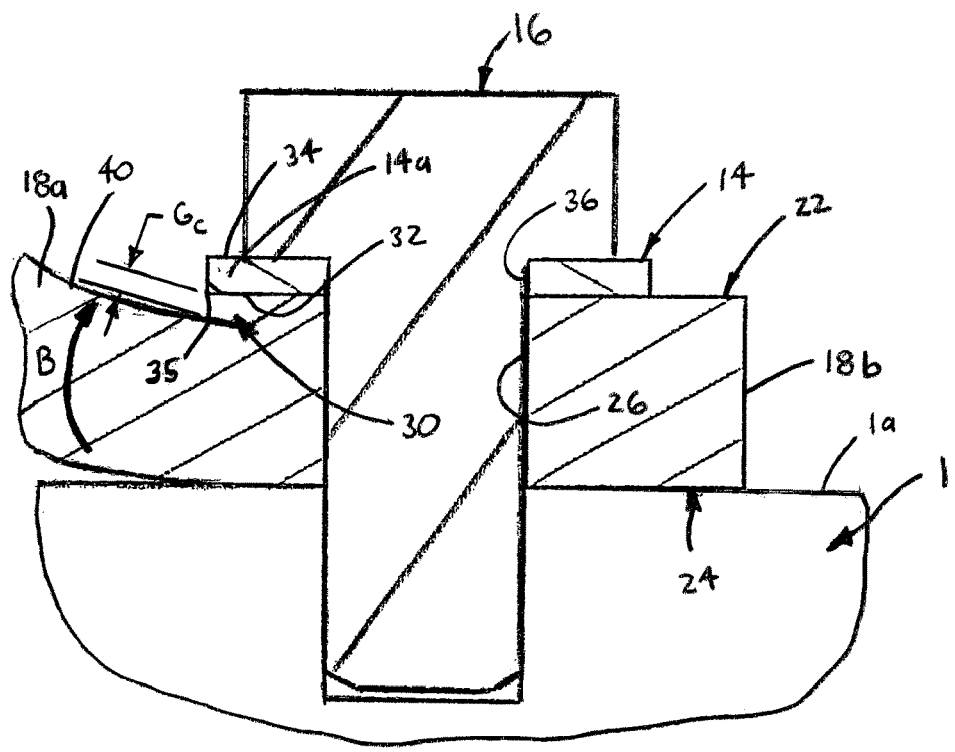
FIG. 7 is an enlarged view of a portion of FIG. 6.
Figure 8:
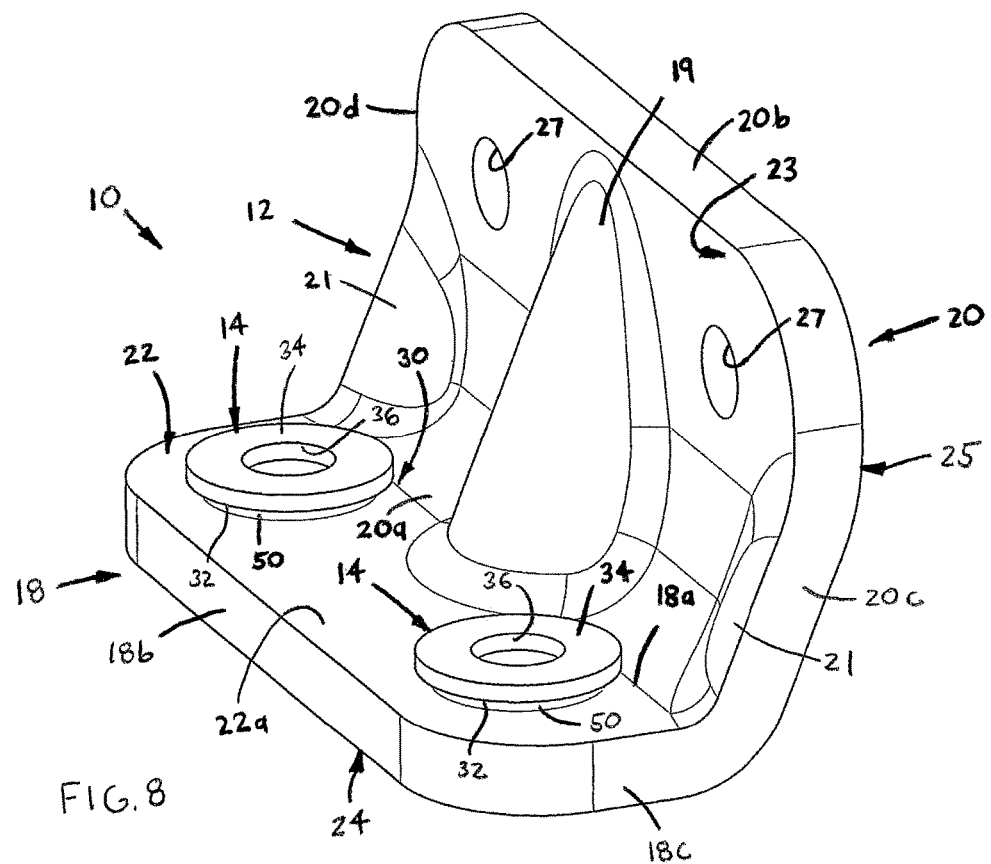
FIG. 8 is perspective view of a second construction of a connector assembly in accordance with the present invention, having a recessed section defined about cylindrical projections.
Figure 14:
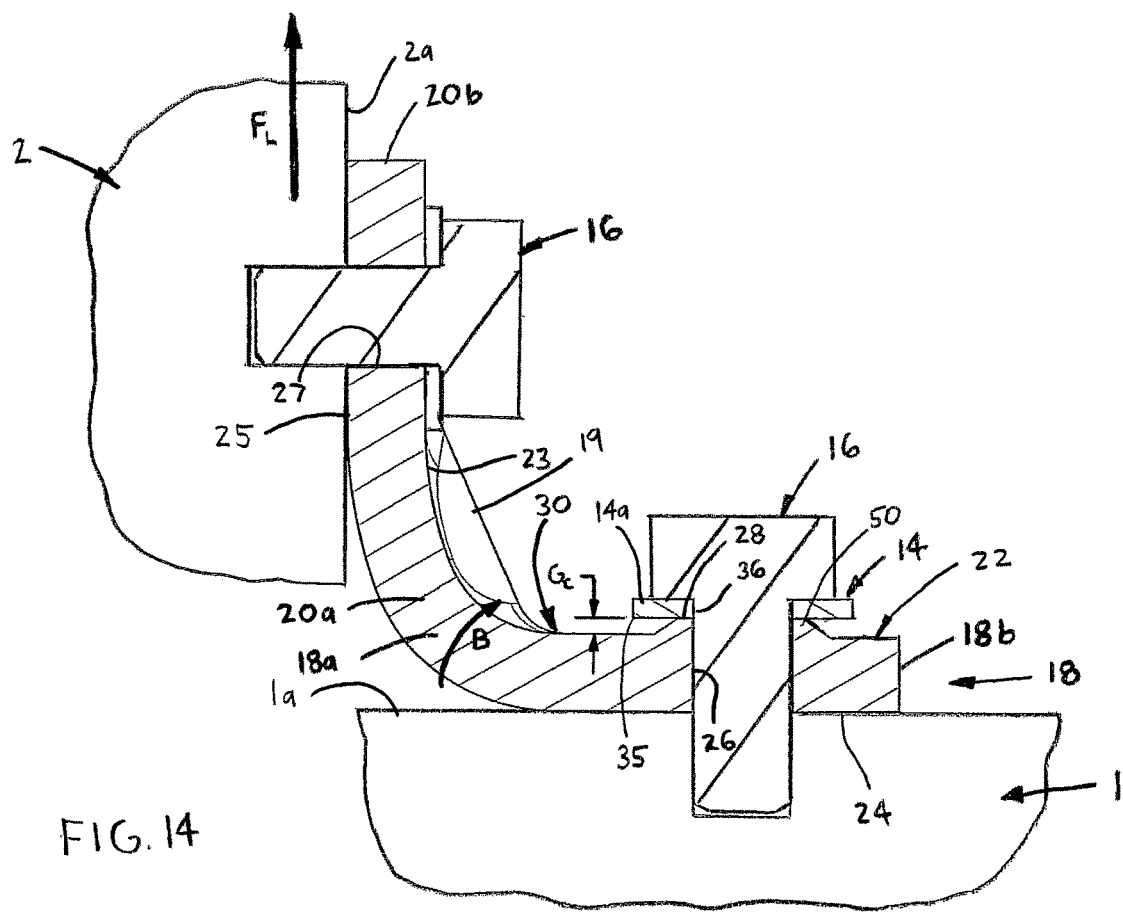
FIG. 14 is a sectional view of the connector assembly, shown connected with first and second members and indicating an applied load.
Figure 15:
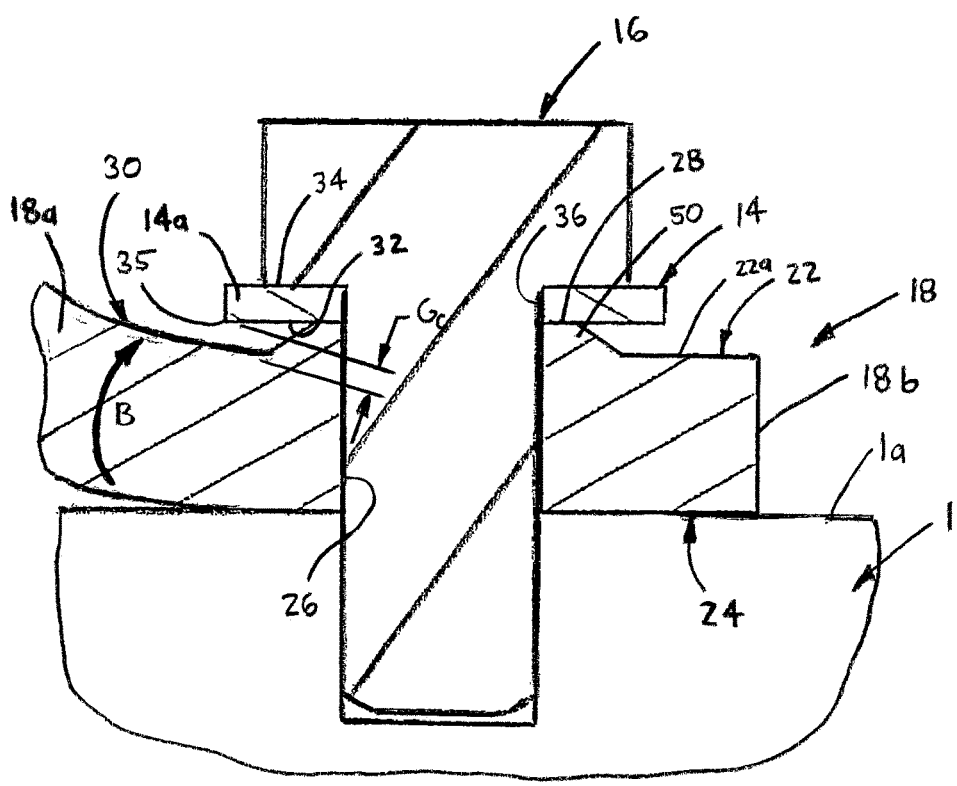
FIG. 15 is an enlarged view of a portion of FIG. 14.

As the fitting 12 is preferably formed of a composite material including fibers embedded in resin (as discussed above), the clearance gap $G_C$ prevents "puncturing" (i.e., piercing, cutting or otherwise shearing) of the fitting composite material. In other words, by having a recessed section 30 that is "overhung" by the outer perimeter or portion 14a of the washer 14, the resulting clearance gap $G_C$ ensures that the outer edge 35 of the washer 14 does not contact the material of the fitting 12 when loading on the fitting 12 causes the inner end 18a of the first mounting portion 18 to bend or deflect generally toward the outer end 18b of the first mounting portion 18, as indicated by arrow B in FIGS. 6, 7 14 and 15. For example, such loading may be generated by a force $F_L$ applied to the second mounting portion 20 in a direction generally away from the first mounting portion 18, as depicted in FIGS. 6 and 14, but may alternatively or additionally be generated by any other force or moment applied to the fitting 12 that causes bending or deflecting thereof. In any case, the recessed section 30 of the first mounting portion 18 provides the fitting 12 with an "anti-puncturing" feature to prevent damage to the fitting material.

In certain preferred constructions as generally shown in FIGS. 1-6 and 8-14, each mounting portion 18, 20 is generally rectangular and further has two opposing, generally parallel side ends 18c, 18d and 20c, 20d extending between the inner and outer ends 18a, 18b and 20a, 20b, respectively. However, either or both mounting portions 18, 20 may have any other appropriate shape, such as generally triangular, generally semicircular (e.g., having a single curved outer edge or end) or even complex-shaped. Further, the fitting 12 is preferably generally L-shaped, as discussed above, and more preferably is generally "right-angled" such that the substantial parts of the mounting portions 18, 20 are generally perpendicular to each other. However, the mounting portions 18, 20 may alternatively be angled or inclined with respect to each other by any other desired degree or extent. In any case, with the two mounting portions 18, 20 being angled with respect to each other, each mounting portion inner surface 22, 23 faces generally toward the other inner surface 23, 22 and the two mounting portion outer surfaces 24, 25 face generally away from each other.

Further, in presently preferred constructions, the fitting 12 has a central reinforcement projection 19 extending outwardly from the second mounting portion inner surface 23 and generally longitudinally between the second mounting portion outer end 20b and the first mounting portion inner end 18a, and two lateral reinforcement projections 21 extending inwardly from each side end 20c, 20d of the second mounting portion 20. However, the fitting 12 may have reinforcing projections or structure located and formed in any other manner, for example formed in the first mounting portion 18, as desired for a particular application or may be formed without any such reinforcement.

Referring to FIGS. 1-7, in a first preferred fitting construction as mentioned above, the load surface section(s) 28 are each generally continuous with a remainder 22a of the first mounting portion inner surface 22 and the first mounting portion 18 has a generally elongated groove 40 providing the recessed section 30. The groove 40 preferably extends inwardly from the inner surface 22 of the first mounting portion 18 and generally laterally between the two mounting portion side edges 18c, 18d, and is preferably located adjacent to the load surface sections 28 of each one of the two preferred mounting holes 26. More specifically, the groove 40 is preferably an elongated, open-ended channel bounded by bottom surface 42 spaced inwardly from the inner surface 22 and toward the outer surface 24, a side surface 44 extending between the mounting portion inner surface 22 and the bottom surface 42, and an opposing side surface 46 extending between the bottom surface 42 and the second mounting portion inner surface 23.

However, the groove 40 may be formed in another appropriate manner, such as being closed ended and/or having semi-circular cross-sections, etc. Further, the recessed section 30 may alternatively be formed as one or more cavities, e.g. generally arcuate and extending about and adjacent to each load surface section 28, or in any other appropriate manner that provides a clearance gap $G_C$ between an outer portion 14a of each washer 14 disposed on the first mounting portion 18 and a remainder of the mounting portion 18.

Referring now to FIGS. 8-15, in another or second preferred fitting construction as mentioned above, each of the one or more washer load surface sections 28 is spaced outwardly from a remainder 22a of the inner surface 22 of the body first mounting portion 18. Each load surface section 28 is generally circular and has an outside diameter $OD_L$, as indicated in FIG. 11. Preferably, the first mounting portion 18 has at least one and most preferably two generally circular cylindrical or frustoconical projections 50 each extending generally outwardly from the inner surface 22, with each load surface section 28 being disposed on the outer end 50a of each projection 50 and each mounting hole 26 extending through the projection 50. With this structure, the remainder 22a of the inner surface 22, i.e., all sections of the inner surface 22 except for the load section(s) 28, provide the recessed section 30 of the first mounting portion 18.

Figure 9:
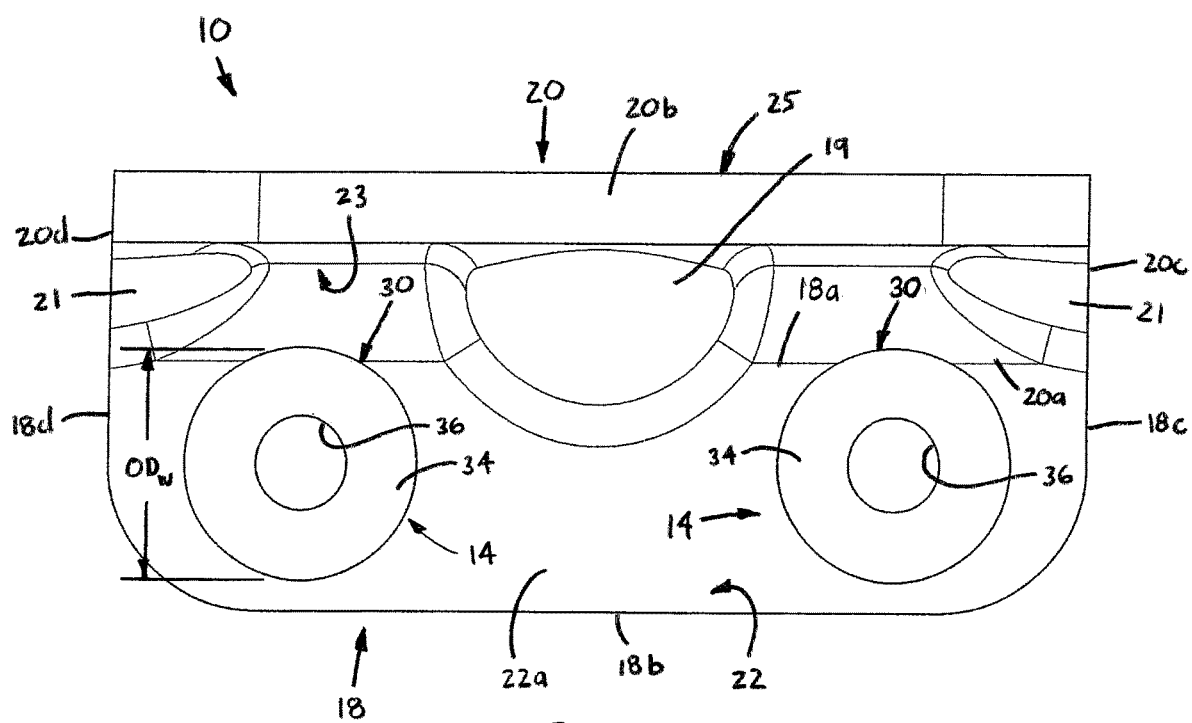
FIG. 9 is top plan view of the second construction connector assembly.
Figure 12:
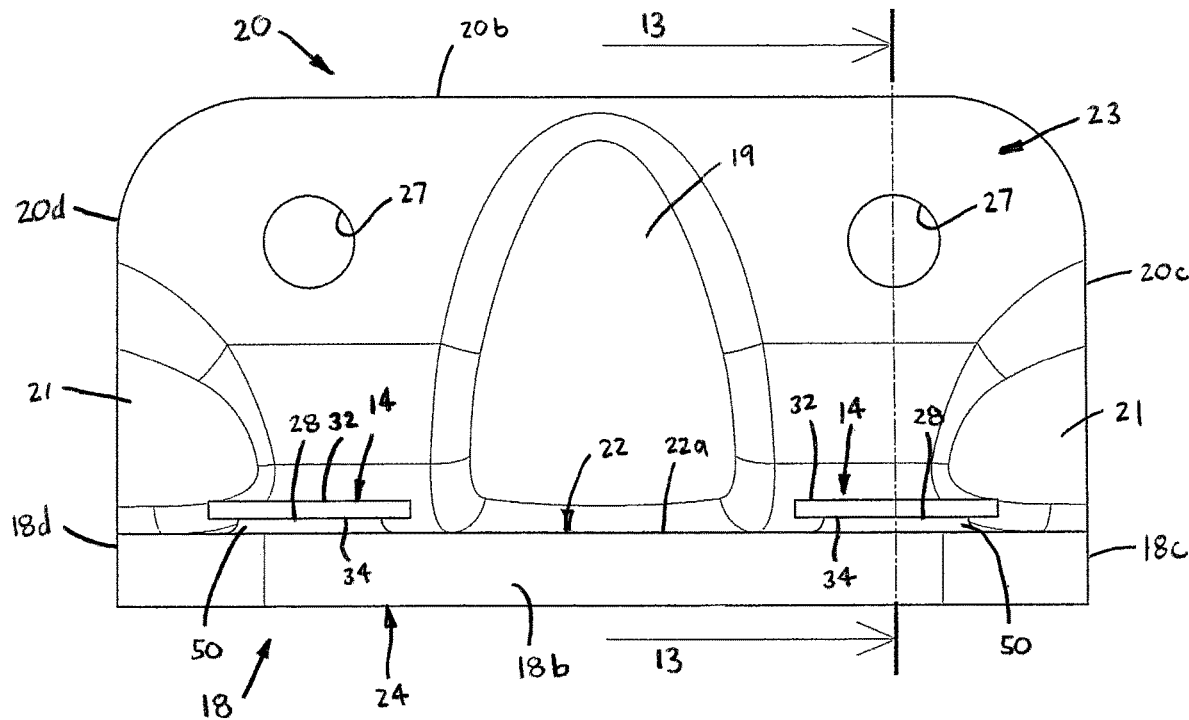
FIG. 12 is a front plan view of the first construction connector assembly
Figure 13:
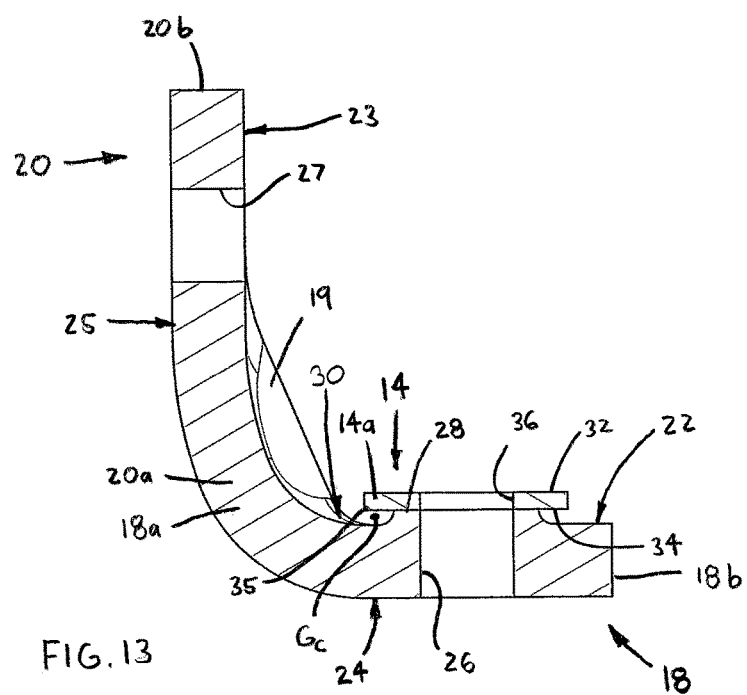
FIG. 13 is a section view through line 13-13 of FIG. 12.

Further, the washer(s) 14 used with the second preferred fitting construction are each preferably generally circular and each has an outside diameter $OD_W$, as indicated in FIG. 9. The washer(s) 14 are sized such that washer outer diameter IN is greater than the load surface outer diameter $OD_L$. As such, when each washer 14 is disposed on one of the load surface sections 28, an annular portion 14a about the entire perimeter of each washer 14 extends over the recessed section 30 of the first mounting portion 18 to define annular clearance gap $G_C$. However, only the portion of gap $G_C$ located generally between the mounting hole 26, and specifically adjacent to the load surface section 28, and the second mounting portion 20 is essential to prevent puncturing or cutting of the fitting 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A connector assembly for connecting at least first and second members, the connector assembly comprising:
   a fitting formed of a composite material including fibers embedded in resin and having first and second mounting portions, each one of the first and second mounting portions having an inner end integrally connected with the inner end of the other one of the first and second mounting portions and an opposing, free outer end, the first mounting portion being connectable to the first member and the second mounting portion being inclined with respect to the first mounting portion and connectable to the second member, the first mounting portion having inner and outer surfaces and at least one mounting hole extending between the inner and outer surfaces and configured to receive a portion of a fastener, the first mounting portion inner surface having a washer load surface section extending generally circumferentially about the at least one mounting hole, the first mounting portion further having a recessed section at least partially located between the at least one mounting hole and the second mounting portion and disposed adjacent to the washer load surface section; and
   at least one washer having inner and outer surfaces, an outer perimetrical edge and a hole extending between the inner and outer surfaces, the washer inner surface being disposeable upon the load surface section of the first mounting portion such that the washer hole is generally aligned with the at least one mounting hole, the washer being sized such that a radially-outermost portion of the washer extends over the recessed section of the first mounting portion so that a clearance gap is defined between the inner surface of the washer radially-outermost portion and the first mounting portion;
   wherein the at least one mounting hole is located such that a section of the washer outer perimetrical edge is proximal to the bracket second mounting portion and wherein the recessed section of the first mounting portion is configured to prevent the washer outer perimetrical edge section from contacting the fitting when the inner end of the first mounting portion bends generally toward the outer end of the first mounting portion so as to prevent puncturing of the fitting composite material.

2. The connector assembly as recited in claim 1 wherein the first mounting portion has two opposing side edges and a groove providing the recessed section, the groove extending inwardly from the inner surface of the first mounting portion and generally laterally between the two side edges.

3. The connector assembly as recited in claim 2 wherein the first mounting portion further has another mounting hole extending between the first portion inner and outer surfaces and configured to receive another fastener, and another washer load surface section extending circumferentially about the another mounting hole, the another mounting hole being located such that each one of the two mounting holes is disposed generally between the other one of the two mounting holes and a separate one of the two side edges, the groove being located adjacent to each one of the two mounting holes.

4. The connector assembly as recited in claim 1 wherein the washer load surface section is spaced outwardly from a remainder of the inner surface of the body first mounting portion and the remainder of the inner surface of the first mounting portion provides the recessed section.

5. The connector assembly as recited in claim 4 wherein the first mounting portion further has another mounting hole, the another mounting hole extending between the first portion inner and outer surfaces and configured to receive another fastener, and another washer load surface section extending circumferentially about the another mounting hole, the another mounting hole being spaced from the at least one mounting hole and the another washer load surface section being spaced outwardly from the remainder of the inner surface of the first mounting portion.

6. The connector assembly as recited in claim 4 wherein the washer is substantially circular and has an outer diameter and the washer load surface section is substantially circular and has an outer diameter, the washer outer diameter being greater than the load surface section outer diameter.

7. The connector assembly as recited in claim 1 wherein the second mounting portion has inner and outer surfaces and at least one mounting hole extending between the inner and outer surfaces and configured to receive a portion of a fastener.

* * * * *